US007156140B1

(12) United States Patent
Houatchanthara

(10) Patent No.: US 7,156,140 B1
(45) Date of Patent: Jan. 2, 2007

(54) HEAT-SHRINKABLE BANDING APPARATUS AND METHOD

(75) Inventor: Sainguen Houatchanthara, Raleigh, NC (US)

(73) Assignee: Axon Corporation, Raleigh, NC (US)

( * ) Notice: Subject to any disclaimer, the term of this patent is extended or adjusted under 35 U.S.C. 154(b) by 94 days.

(21) Appl. No.: 10/862,956

(22) Filed: Jun. 8, 2004

(51) Int. Cl.
*B32B 37/00* (2006.01)
*B65B 9/04* (2006.01)

(52) U.S. Cl. .......................... 156/521; 156/86; 156/85; 156/556; 156/DIG. 14; 156/DIG. 25; 156/DIG. 26; 53/292; 53/399

(58) Field of Classification Search ................ 156/358, 156/363, 521, DIG. 14, DIG. 25, DIG. 36, 156/86, 85, 264, 556; 493/102, 147, 343, 493/375, 379; 53/292, 399
See application file for complete search history.

(56) References Cited

U.S. PATENT DOCUMENTS 3,888,067 A * 6/1975 Cross et al. .................. 53/292
4,387,553 A 6/1983 Strub et al.
4,914,893 A 4/1990 Strub et al.
5,006,196 A 4/1991 Vandevoorde
5,024,049 A 6/1991 Strub et al.
5,060,367 A 10/1991 Vandevoorde
5,305,578 A 4/1994 Menayan
5,433,057 A 7/1995 Lerner et al.
6,474,390 B1 11/2002 Vandevoorde
6,543,514 B1 4/2003 Menayan
2002/0096262 A1* 7/2002 Yang .......................... 156/360
2003/0192639 A1* 10/2003 Mitchell et al. ............ 156/250

* cited by examiner

*Primary Examiner*—Linda Gray
(74) *Attorney, Agent, or Firm*—Thompson Hine LLP

(57) ABSTRACT

An apparatus and method is provided for forming a sleeve from a flat tube and applying the sleeve to a container. A length of flat tube is advanced from a supply to a position between a pair of movable grippers. The grippers are extended to contact and hold the tube, and a cutter severs the length of flat tube from the supply. A vacuum is applied to the grippers, and the grippers are retracted to open the cut flat tube into a round configuration. A second length of flat tube is advanced, pushing the open cut length tube onto a container that is being moved therebeneath on a conveyor.

10 Claims, 3 Drawing Sheets

A
A
20
B
12
26
24
30
28
10
36a
36b
34a
32a
32b
34b
40
44
C
42

A
A
20
10
30
B
12
26
24
28
36a
16
34a
36b
32a
32b
34b
40
44
C
42

A
A
20
12
26
24
B
28
30
16
36a
36b
34a
34b
32a
32b
40
C
42
44

A
A
20
∝
B
26
24
28
30
36a
5
5
36b
34a
34b
32a
32b
40
C
42

HEAT-SHRINKABLE BANDING APPARATUS AND METHOD

FIELD OF THE INVENTION

The present invention relates to the field of machinery and methods for the application of a circumferential band to a container, and more particularly to such machinery and methods in which the band is formed of a tubular film supplied in flat condition.

BACKGROUND OF THE INVENTION

Bands, and their counterparts, i.e. tubular labels, are used commonly for indicating the seal integrity of a container and for enhancing product packaging, respectively. In both the application of bands and tubular labels, a length of flat tubular thin-walled material is severed to form a cut sleeve, and the cut sleeve is placed over the container. If the purpose of the cut sleeve is to indicate whether the container has been opened after being initially sealed, the cut sleeve is relatively short and referred to as a band. If the cut sleeve is intended to cover a major portion of the container, the cut sleeve is relatively long and referred to as a label. Such bands and labels are typically formed from extruded or welded thermoplastic resin tubes, for example polyvinyl chloride (PVC) or polyethylene (PE). In many cases, the plastic tubes are pre-stretched radially so that they can be readily placed over a container and subsequently shrunk when subjected to heat.

A known machine for providing and applying bands to containers is described in U.S. Pat. No. 5,305,578 entitled Heat-Shrinkable Band Application Machine and incorporated herein by reference. The machine described in this '578 patent performs the desired functions by advancing a length of film tubing, grasping an end portion of the film tube with angularly oriented suction cups, cutting the length of film tube from the supply, expanding the angularly held cut sleeve into a position offset from the film tube supply and releasing the suction cups as a plunger descends to push the cut sleeve onto a container being moved by a conveyor.

SUMMARY OF THE INVENTION

The present invention provides an apparatus and method for mounting a band or label onto a container in a simplified and more efficient process. A selected length of flat film tube is advanced from a tubing supply, the length is held between a pair of opposed suction cups and severed from the tubing supply. The suction cups separate to open the cut length forming a rounded configuration in axial alignment with the tubing supply. When a product container is detected to be approaching a sleeve mounting position, the vacuum is released and a further length of flat film tube is advanced to push the opened cut sleeve onto the container. This process is repeated sequentially as additional containers are moved into position for receiving cut sleeves.

BRIEF DESCRIPTION OF THE DRAWINGS

The present invention is best understood in conjunction with the accompanying drawing figures in which like elements are identified by similar reference numerals and wherein:

FIG. 1 is a diagrammatic side view of the banding apparatus of the present invention with a length of flat film tubing extended.

FIG. 2 is a diagrammatic side view of the banding apparatus of FIG. 1, showing the cutter blade and the grippers advanced.

FIG. 3 is a diagrammatic side view of the banding apparatus of FIG. 2 showing the cutter blade retracted and a cut sleeve opened.

FIG. 4 is a diagrammatic side view of the banding apparatus of FIG. 3 showing the opened cut sleeve pushed onto a container.

DETAILED DESCRIPTION OF THE PREFERRED EMBODIMENT

Figure 1:
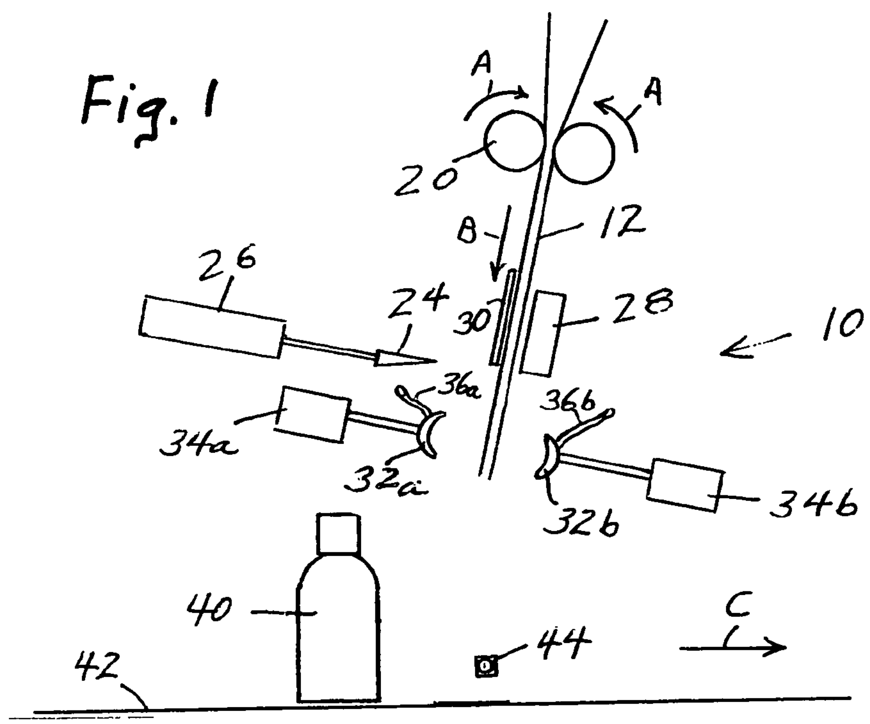
FIGS. 1–4 are time sequenced views of the invention apparatus.

Referring now to FIG. 1, a diagrammatic side view illustrates an apparatus for mounting heat-shrinkable bands onto containers. Thin-wall film tubing 12 is provided from a supply reel (not shown) and passes between a pair of drive rollers 20 and past a cutter comprising movable blade 24, stationary shear block 28 and actuator 26. The angular orientation of film tube 12 with respect to a container 40 will be discussed below. In the section above drive rollers 20, film tube 12 is in flattened condition on the supply reel (not shown) and passes over a spreader, for example the spreader described in U.S. patent application Ser. No. 10/789,216 entitled Tubular Banding Apparatus And Method, incorporated herein by reference. Thus, film tube 12 is shown reducing from a wide aspect above drive rollers 20 to a narrow aspect at and below drive rollers 20, whereas in both conditions film tube 12 is flat in mutually perpendicular planes. Drive rollers 20 are rotated intermittently in the directions indicated by arrows A by a drive motor (not shown) to cause film tube 12 to move downward in the direction indicated by arrow B. The length of film tube 12 to be advanced by each operative cycle of drive rollers 20 is variable according to the process parameters. Film tube 12 is guided in a straight path from drive rollers 20 to a position between a pair of grippers 32*a* and 32*b* by being passed through a channel formed by shear block 28 and a guide 30 residing parallel to one another.

A first gripper 32*a*, for example a suction cup, is assembled to the end of a rod of a first actuator 34*a*, for example a pneumatic cylinder. A second gripper 32*b* is assembled to a second actuator 34*b*. Actuators 34*a* and 34*b* are mounted in axial alignment with one another with grippers 32*a* and 32*b* positioned respectively on either side of the path of film tube 12. Actuator 34*a* and actuator 34*b* are extendable to achieve contact between grippers 32*a*, 32*b* and film tube 12. The descriptive term "suction cup" is used here for explanatory reasons, and is not to be construed as a limitation on the scope of the invention. For a purpose to be described below, a first vacuum supply hose 36*a* is connected to gripper 32*a* and a second vacuum supply hose 36*b* is connected to gripper 32*b*.

A cutter for film tube 12 consists of movable blade 24 that is mounted on the cylinder rod of blade actuator 26 and a stationary blade, for example shear block 28. Blade 24 and shear block 28 are mounted on opposite sides of film tube 12 at a location below drive rollers 20 and above grippers 32*a* and 32*b*. When actuator 26 extends blade 24, blade 24 passes in shearing contact with shear block 28 to sever a length of film tube 12 from the film tubing supply.

An exemplary container 40, in a series of similar containers, is transported along conveyor 42 in the direction indicated by arrow C to pass a band applying point in alignment with the lower end of film tube 12. A sensor 44, for example a photosensitive cell, is mounted above conveyor 42 and below the end of film tube 12 in a position to sense the approach of container 40 to the band applying point at which a cut length of film tube 12 will be mounted onto container 40.

Figure 2:
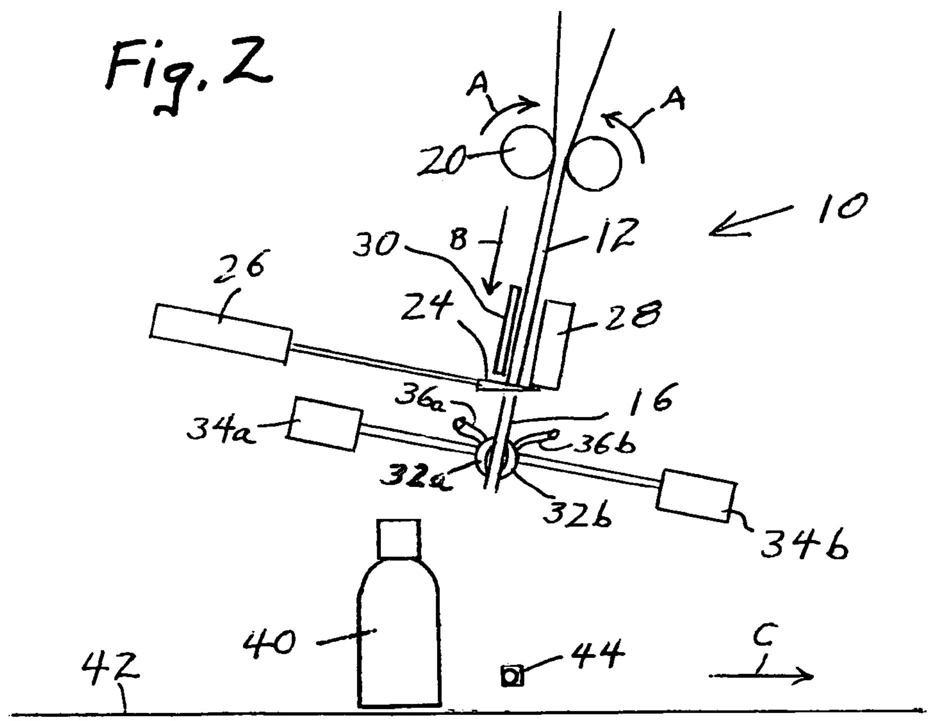

Referring now to FIG. 2, a selected length of film tube 12 is advanced and the lower end thereof is positioned between grippers 32*a* and 32*b*, as described above in reference to FIG. 1. Grippers 32*a* and 32*b* extend and blade 24 cuts film tube 12 to form cut sleeve 16. In this manner, the lower end of film tube 12 is firmly held in position between grippers 32*a* and 32*b* while film tube 12 is cut from the tubing supply to form flat cut sleeve 16. Grippers 32*a* and 32*b* hold cut sleeve 16 in substantial alignment with film tube 12. During this time frame, container 40 has been moving incrementally along on conveyor 42 in the direction indicated by arrow C.

Figure 3:
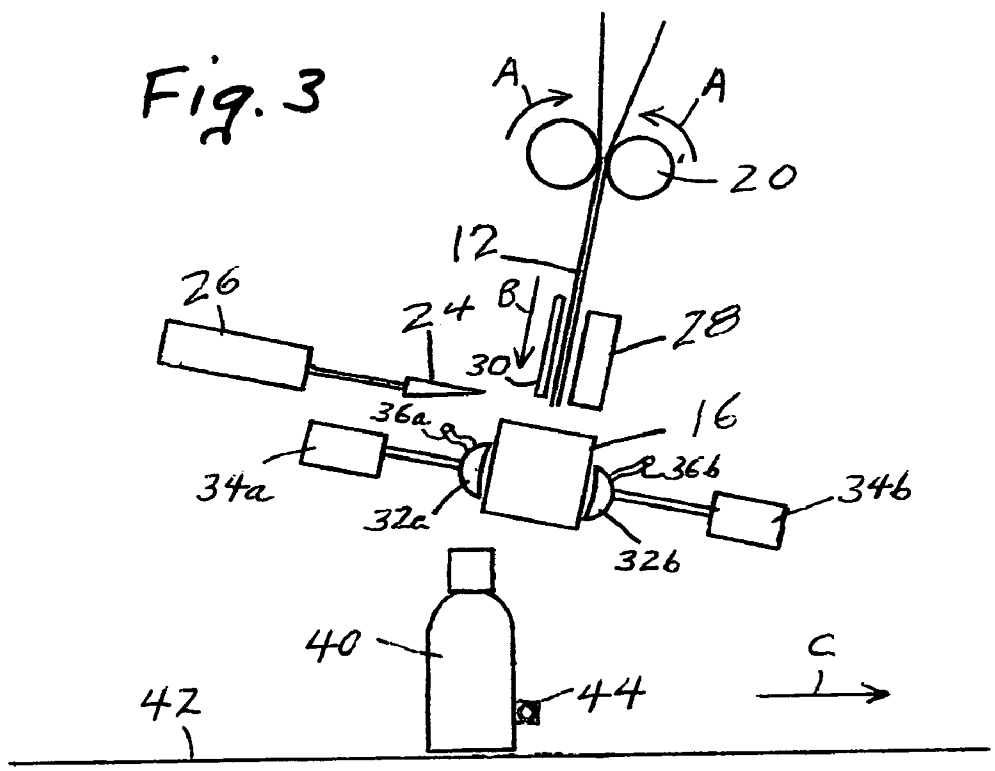

Referring now to FIG. 3, blade actuator 26 retracts to reposition blade 24 out of the downward path of film tube 12 and a negative pressure, or vacuum, is applied through hose 36*a* and hose 36*b* to enable grippers 32*a* and 32*b* to securely maintain their hold on opposed sides of cut sleeve 16. Next, actuators 34*a* and 34*b* are reversed, resulting in the separation of grippers 32*a* and 32*b*, opening cut sleeve 16 to a round, or near-round, configuration, as viewed from above (see FIG. 5). Grippers 32*a* and 32*b* move apart equally so as to maintain axial alignment between flat film tube 12 and open sleeve 16. Grippers 32*a* and 32*b* maintain their respective positions as exemplary container 40 has been moving still farther along on conveyor 42 to a position impinging the target area of sensor 44. The movements of film tube 12, grippers 32*a*, 32*b* and movable blade 24 are deactivated until a subsequent cycle is initiated. At the point that sensor 44 detects the position of container 40 on conveyor 42, sensor 44 transmits a signal to a controller (not shown). By computing the time at which container 40 will have moved from the position at which it was detected by sensor 44 to a position for receiving cut sleeve 16, the controller initiates a further cycle of the invention banding apparatus to occur, placing cut sleeve 16 onto container 40. Conveyor 42 moves container 40 along its path continuously without interruption.

Figure 4:
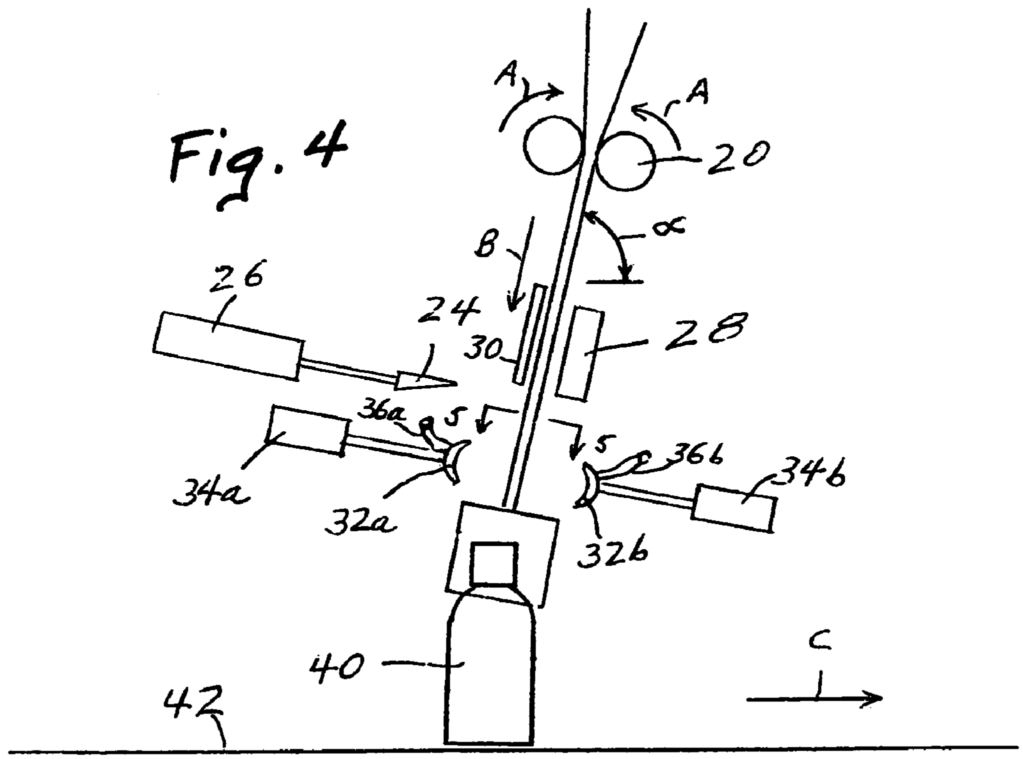
Figure 5:
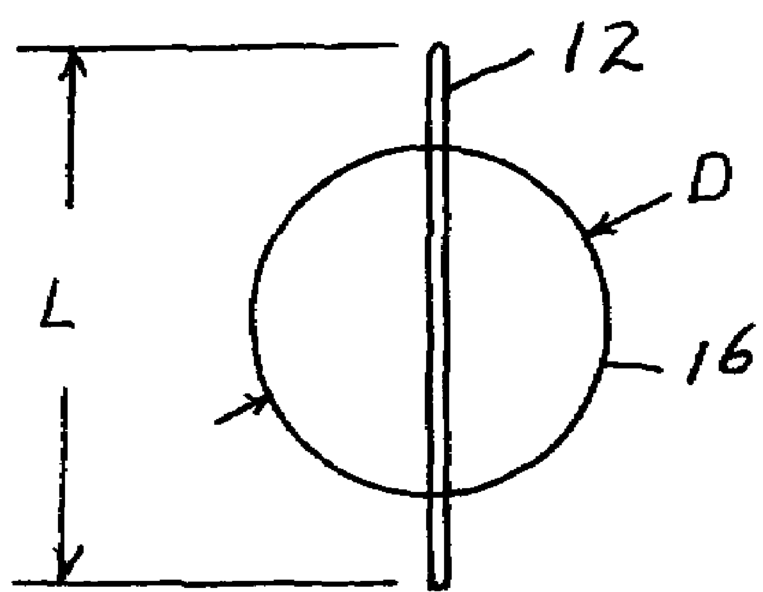
FIG. 5 is a view taken in the direction of line 5—5 of FIG. 4 showing the relationship between the flat tube and the open cut sleeve.

Referring now to FIG. 4, the controller causes cut sleeve 16 to be assembled onto container 40 by causing drive rollers 20 to rotate a further increment in the direction of arrows A to extend an additional selected length of film tube 12 between guide 30 and shear block 28 to contact cut sleeve 16. The downward movement of film tube 12 releases open cut sleeve 16 from being suspended between grippers 32*a* and 32*b*, pushing cut sleeve 16 onto the neck of container 40 as conveyor 42 continuously moves container 40 therealong. Optionally, the vacuum applied to grippers 32*a* and 32*b* is deactivated in coordination with the movement of a subsequent length of flat tube 12. FIG. 5, a top view taken in the direction of line 5—5 of FIG. 4, clearly shows that the layflat width L of film tube 12 is greater than the diameter D of open cut sleeve 16. When film tube 12 is extended into contact with open cut sleeve 16, open cut sleeve 16 is moved onto container 40. Suction cups 32*a* and 32*b* remain in the position shown in FIG. 4, with extended film tube 12 therebetween for repeating the cutting, opening and assembling steps described above. Additional containers, similar to exemplary container 40, are conveyed in spaced apart relation by conveyor 42 in a series, each container triggering the apparatus of the invention to discharge a cut sleeve onto the triggering container, forming and opening another cut sleeve as described above.

The mechanism that comprises the invention, drive rollers 20, cutter 24, 26, 28 and grippers 32, 34, is oriented so that film tube 12, and more particularly cut sleeve 16, is presented at an angle α to the orientation of container 40 directed toward a band applying position. The band applying position coordinates the conveyed position of container 40 with the discharging of cut sleeve 16. This angular relation between film tube 12 and container 40 optimizes the accuracy and improves the speed of mounting cut sleeve 16 on container 40 by placing the right end (as illustrated) of cut sleeve 16 onto the leading edge of the container, allowing the left end to drop into place as container 40 continues to move in the direction of arrow C. Film tube 12 preferably resides at an angle α of less than 90° above horizontal and more preferably between 65° and 85° above horizontal, most preferably about 75° above horizontal. In addition, actuators 34*a* and 34*b* reside in perpendicular relation to film tube 12.

Thus, the process in the invention employs the following steps:

1. Advance a first selected length of flat film tube from a supply of flat tubing;
2. Simultaneously extend a pair of opposed grippers to contact opposite sides of the film tube;
3. Cut the length of film tube from the supply to form a cut sleeve;
4. Actuate a vacuum source connected to the pair of grippers;
5. Retract the cutting mechanism out of the path of the film tube;
6. Retract the pair of grippers to open the cut sleeve;
7. Sense the approach of a container being conveyed to a band or label application location and transmit a signal in response thereto;
8. Release the vacuum on the suction cups; and
9. Advance a second selected length of flat film tube to push the cut sleeve onto the container.

While the description above discloses preferred embodiments of the present invention, it is contemplated that numerous variations and modifications of the invention are possible and are considered to be within the scope of the claims that follow.

What is claimed is:

1. A heat-shrinkable banding apparatus for mounting a band onto a container, comprising:

a. a flattened tubular film supply;

b. means for advancing sequential selected lengths of a flat film tube along a path from the supply to a band applying point;

c. means for conveying containers to and past the band applying point;

d. a cutter positioned between the means for advancing a length of film tube and the means for conveying containers and operative for severing the advanced length from the supply;

e. a pair of grippers positioned on either side of the path between the cutter and the container conveyor;

f. means to extend the grippers to engage the film tube;

g. means to activate the grippers for gripping the advanced length of film tube;

h. means to retract the grippers while continuing to grip the advanced length of film tube in order to open the film tube to a round or near-round condition; and i. wherein a subsequent selected length of flat film tube being advanced along the path contacts and moves a prior selected length of opened film tube from the grippers onto a container, and wherein the path is oriented at an angle to an axis of the container so that a first end of the opened film tube contacts the container initially and a second end of the opened film tube subsequently drops onto the container as the container moves past the band applying point.

2. The heat-shrinkable banding apparatus described in claim 1, wherein the means for conveying containers comprises a container conveyor with a sensor located adjacent thereto for detecting a container approaching the band applying point.

3. The heat-shrinkable banding apparatus described in claim 1, wherein the means to activate the grippers comprises a vacuum source operatively connected to the pair of grippers to enable the grippers to grip and open the film tube as the grippers are being retracted.

4. The heat-shrinkable banding apparatus described in claim 1, wherein the pair of grippers comprises a pair of suction cups mounted on a pair of actuators for extending and retracting the grippers.

5. A heat-shrinkable banding apparatus for mounting a band onto a container, comprising:

a. a flattened tubular film supply;

b. means for advancing a selected length of film tube from the supply to a band applying point along a linear path oriented at an angle between horizontal and vertical;

c. a cutter positioned downstream of the means for advancing the length of film tube and operative for severing the advanced length from the supply;

d. a pair of grippers positioned on either side of the linear path; and e. means to extend, activate and retract each of the grippers to engage and open a cut length of film tube;

f. wherein advancing a subsequent selected length of flat film tube pushes an open severed length of film tube held by the grippers angularly onto a vertically oriented container.

6. The heat-shrinkable banding apparatus described in claim 5, wherein the path resides at an angle between 65° and 85° above horizontal.

7. The heat-shrinkable banding apparatus described in claim 6, wherein the path resides at an angle of approximately 75° above horizontal.

8. The heat-shrinkable banding apparatus described in claim 5, wherein the means to extend and retract each of the grippers comprises a pair of actuators.

9. The heat-shrinkable banding apparatus described in claim 8, wherein the grippers are operative to open the film tube from flat to a non-flat section.

10. The heat-shrinkable banding apparatus described in claim 5, wherein the means to activate the grippers comprises a vacuum source operatively connected to the pair of grippers to enable the grippers to open the film tube.

* * * * *